(12) United States Patent
Oh et al.

(10) Patent No.: US 11,274,041 B2
(45) Date of Patent: Mar. 15, 2022

(54) METHOD FOR PREPARING SINGLE-WALL CARBON NANOTUBE FIBER ASSEMBLY

(71) Applicant: LG CHEM, LTD., Seoul (KR)

(72) Inventors: Eugene Oh, Daejeon (KR); Juhan Kim, Daejeon (KR); Ji Eun Kim, Daejeon (KR); Won Jae Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 468 days.

(21) Appl. No.: 16/321,951

(22) PCT Filed: Aug. 11, 2017

(86) PCT No.: PCT/KR2017/008713
§ 371 (c)(1),
(2) Date: Jan. 30, 2019

(87) PCT Pub. No.: WO2018/070653
PCT Pub. Date: Apr. 19, 2018

(65) Prior Publication Data
US 2019/0177166 A1 Jun. 13, 2019

(30) Foreign Application Priority Data

Oct. 12, 2016 (KR) .......................... 10-2016-0131812

(51) Int. Cl.
*C01B 32/164* (2017.01)
*D01D 7/00* (2006.01)
(Continued)

(52) U.S. Cl.
CPC .......... *C01B 32/164* (2017.08); *C01B 32/159* (2017.08); *C01B 32/162* (2017.08);
(Continued)

(58) Field of Classification Search
CPC ... C01B 32/164; C01B 32/159; C01B 32/168; C01B 32/162; C01B 2202/02;
(Continued)

(56) References Cited

U.S. PATENT DOCUMENTS 7,323,157 B2 1/2008 Kinloch et al.
7,628,974 B2 12/2009 Grill et al.
(Continued)

FOREIGN PATENT DOCUMENTS

EP 1673489 B1 10/2013
EP 2615193 B1 9/2015
(Continued)

OTHER PUBLICATIONS

Tran, Thang Q., et al. "Super-strong and highly conductive carbon nanotube ribbons from post-treatment methods." Carbon 99 (2016): 407-415.*
(Continued)

*Primary Examiner* — Richard M Rump
(74) *Attorney, Agent, or Firm* — Dentons US LLP

(57) ABSTRACT

The present invention relates to a method for preparing a carbon nanotube fiber aggregate formed of single-wall carbon nanotubes, and the manufacturing efficiency of a carbon nanotube fiber comprising single-wall carbon nanotubes can be improved by controlling the molar ratio of a carbon source and of a reducing gas in a carrier gas.

7 Claims, 3 Drawing Sheets

(51) Int. Cl.
*C01B 32/162* (2017.01)
*C01B 32/159* (2017.01)
*D01F 9/133* (2006.01)
*C01B 32/168* (2017.01)

(52) U.S. Cl.
CPC .............. *C01B 32/168* (2017.08); *D01D 7/00* (2013.01); *D01F 9/133* (2013.01); *C01B 2202/02* (2013.01); *C01P 2002/82* (2013.01); *D10B 2101/122* (2013.01)

(58) Field of Classification Search
CPC ........... C01B 32/16; D01F 9/133; D01D 7/00; C01P 2002/82; C01P 2004/13; D10B 2101/122
See application file for complete search history.

(56) References Cited

U.S. PATENT DOCUMENTS

| | | |
|---|---|---|
| 8,101,150 B2 | 1/2012 | Grill et al. |
| 9,410,268 B2 | 8/2016 | Jeong et al. |
| 2009/0186223 A1 | 7/2009 | Saito et al. |
| 2015/0110704 A1 | 4/2015 | Jeong et al. |
| 2017/0292208 A1 | 10/2017 | Yoon et al. |

FOREIGN PATENT DOCUMENTS

| | | |
|---|---|---|
| EP | 2631330 B1 | 9/2015 |
| JP | 2007-536434 A | 12/2007 |
| JP | 2013-018673 A | 1/2013 |
| KR | 10-2006-0094958 A | 8/2006 |
| KR | 10-2008-0113242 A | 12/2008 |
| KR | 10-2013-0134216 A | 12/2013 |
| KR | 10-1355038 B1 | 1/2014 |
| KR | 10-2014-0071793 A | 6/2014 |
| KR | 10-2016-0049998 A | 5/2016 |

OTHER PUBLICATIONS

Motta, Marcelo, et al. "The parameter space for the direct spinning of fibres and films of carbon nanotubes." Physica E: Low-dimensional Systems and Nanostructures 37.1-2 (2007): 40-43.*
Jung, Yeonsu, et al. "Controlling the crystalline quality of carbon nanotubes with processing parameters from chemical vapor deposition synthesis." Chemical engineering journal 228 (2013): 1050-1056.*
Saeed, Ghuzanfar. "Control of Vapor Pressure and Flow-Rate on the Growth of Carbon Nanotubes in Co Based Catalyst and Ethanol Decomposition Process." Advanced Science, Engineering and Medicine 5.9 (2013): 937-942.*
Lee. Sung-Hyun et al., "Synthesis of Carbon Nanotube Fibers Using the Direct Spinning Process Based on Design of Experiment (DOE)", Carbon, 2016, vol. 100, pp. 647-655 (Published online: Jan. 20, 2016).
Song, Jun Young et al., "Effects of Surfactant on Carbon Nanotube Assembly Synthesized by Direct Spinning", Chemical Engineering Science, 2013, vol. 104, pp. 25-31.
Choo, Hungo et al., "Fabrication and Applications of Carbon Nanotube Fibers", Carbon Letters, 2012, vol. 13, No. 4, pp. 191-204.
G Y Xiong et al. "Effect of temperature, pressure, and gas ratio of methane to hydrogen on the synthesis of double-walled carbon nanotubes by chemical vapour deposition"KR-Nanotechnology, vol. 16, 2005, pp. 532-535.
Sundaram, et al.: "Continuous Direct Spinning of Fibers of Single-Walled Carbon Nanotubes with Metallic Chirality", XP055012142, Advanced Materials, vol. 23, No. 43, Oct. 10, 2011, pp. 5064-5068.
Sundaram, et al.: "Supporting Information: Continuous Direct Spinning of Fibers of Single-Walled Carbon Nanotubes with Metallic Chirality", XP055608438, Advanced Materials, vol. 23, No. 43, Oct. 10, 2011, pp. 5064-5068.
Li, et al.: "Direct Spinning of Carbon Nanotube Fibers from Chemical Vapor Deposition Synthesis", XP008128720, Science, American Association for the Advancement of Science (AAAS), vol. 304, Apr. 9, 2004, pp. 276-278.

* cited by examiner $$\frac{IG}{ID} = (-4.06 \times 10^2)\text{Å} + 32.8$$

METHOD FOR PREPARING SINGLE-WALL CARBON NANOTUBE FIBER ASSEMBLY

The present application is a National Phase entry pursuant to 35 U.S.C. § 371 of International Application No. PCT/KR2017/008713 filed Aug. 11, 2017, and claims the benefit of priority to Korean Patent Application No. 10-2016-0131812, filed on Oct. 12, 2016 which is incorporated herein by reference in its entirety for all purpose.

FIELD

The present invention relates to a method for producing an aggregate of carbon nanotube fibers comprising single-wall carbon nanotubes.

BACKGROUND

Carbon nanotubes (CNTs) are allotropes of carbon, and are substances with a diameter of several to several tens of nanometers and a length of several hundred micrometers to several millimeters. These materials have been reported in the journal Nature in 1991 by Dr. Iijima and have been studied in a variety of fields due to their excellent thermal, electrical and physical properties, and high aspect ratio. The inherent characteristics of such carbon nanotubes result from the sp2 bond of carbon. Carbon nanotubes are stronger than iron and lighter than aluminum, and have an electrical conductivity similar to that of metals. Carbon nanotubes are roughly classified into single-wall carbon nanotubes (SWNT), double-wall carbon nanotubes (DWNT), and multi-wall carbon nanotubes (MWNT), according to the number of walls of a nanotube. Also, carbon nanotubes can be classified into zigzag, armchair, and chiral structures according to their asymmetry/chirality.

Most research to date has been directed toward using carbon nanotubes as reinforcing agents for composites by dispersing powdered carbon nanotubes, or producing transparent conductive films using dispersed solutions containing carbon nanotubes. In some areas, commercialization has already begun. Meanwhile, in order to use carbon nanotubes in composite materials and transparent conductive films, dispersion of carbon nanotubes is important. However, it is difficult to disperse them at a high concentration and maintain dispersibility because of cohesive forces from the strong van der Waals force of carbon nanotubes. In addition, in the case of a composite material in which carbon nanotubes are used as reinforcing agents, it is difficult to sufficiently manifest the excellent properties of carbon nanotubes.

Recently, carbon nanotube fibrillation research have been carried out to produce carbon nanotube structures that fully manifest the properties of carbon nanotubes.

Coagulation spinning, liquid-crystalline spinning, and direct spinning are typical methods of producing fibers using a dispersion solution containing carbon nanotubes and a dispersant.

Coagulation spinning is a scheme for fiberizing carbon nanotubes in which a dispersing solution containing carbon nanotubes and a dispersant is injected into a polymer solution to allow the dispersant in the dispersing solution to escape into the polymer solution and the polymer is substituted for the site to act as a binder.

The liquid-crystalline spinning is a scheme in which a carbon nanotube solution is fiberized using a property of forming a liquid crystal under a specific condition. While this scheme has the advantage of being able to make carbon nanotube fibers with good orientation, the spinning speed is very slow and the liquid crystal forming condition of a carbon nanotube solution is complicated.

As shown in FIG. 1, direct spinning is a scheme for obtaining fibers in which a liquid carbon source and a catalyst are injected into the upper injection port of a vertically erected high-temperature furnace with a carrier gas. Carbon nanotubes are synthesized in the furnace, and the carbon nanotube aggregate which has been brought to the lower portion of the heating furnace together with the carrier gas winds its way up inside of the furnace (A in FIG. 1) or outside of the furnace (B in FIG. 1).

Carbon nanotubes (CNTs) may be broadly divided into single-wall CNTs and multi-wall CNTs depending on the number of graphene layers. Among the multi-wall CNTs, the two-layered CNTs may be separately classified since they have a separate application area. The mechanical strength of the CNTs itself, particularly the tensile strength, is very high, exceeding 100 GPa. However, since synthesized CNTs are short fibers having a short length, the application area is very limited. In order to solve this problem, a method of making long CNT fibers by connecting CNTs which are short fibers has been recently studied.

Variables affecting the strength of CNT fibers may include length and diameter of CNTs, and bonding strength between CNTs, etc. In order to improve the strength of CNT fibers, the length of CNTs constituting CNT fibers must be long, the diameter thereof must be small, and the bonding strength between the CNTs must be high. In particular, in order to reduce the diameter of the CNT, it is necessary to produce CNT fibers composed of single-wall CNTs.

SUMMARY

Technical Problem

It is an object of the present invention to provide an efficient method for producing carbon nanotube fibers composed of single-wall carbon nanotubes.

Technical Solution

In order to solve the technical problem, the present invention provides a method for producing an aggregate of carbon nanotube fibers by spinning a raw material containing a carbon source in the presence of a carrier gas containing a reducing gas, the method comprising controlling the molar ratio of the carbon source to the reducing gas in the carrier gas and (carbon source/reducing gas) to less than 0.065 to produce the aggregate composed of single-wall carbon nanotubes. According to an embodiment, the molar ratio (A) of the carbon source to the reducing gas and the value of IG/ID of the resulting aggregate of carbon nanotube fibers may satisfy the following Equation 1:

$$(-4.06 \times 10^2)A + 29.4 \leq IG/ID \leq (-4.06 \times 10^2)A + 37.5$$

wherein, the IG/ID means a ratio of the maximum peak intensity IG in the range of 1560 $cm^{-1}$ to 1600 $cm^{-1}$ to the maximum peak intensity ID in the range of 1310 $cm^{-1}$ to 1350 $cm^{-1}$, by the resonance Raman spectroscopy scheme.

According to an embodiment, the IG/ID value of the Equation 1 may satisfy IG/ID>6.

Also, the reducing gas may comprise hydrogen gas, ammonia gas or a mixed gas thereof.

Also, the carrier gas may further comprise an inert gas.

Also, the raw material for spinning may comprise a catalyst precursor dispersed in a liquid or gaseous carbon compound.

The liquid or gaseous carbon compound may include at least one selected from the group consisting of methane, ethylene, acetylene, methyl acetylene, vinyl acetylene, ethanol, methanol, propanol, acetone, xylene, chloroform, ethyl acetic acid, diethyl ether, polyethylene glycol, ethyl formate, mesitylene, tetrahydrofuran (THF), dimethylformamide (DMF), dichloromethane, hexane, benzene, carbon tetrachloride, and pentane.

The catalyst precursor may include at least one selected from the group consisting of iron, nickel, cobalt, platinum, ruthenium, molybdenum, vanadium, and oxides thereof.

According to a preferable embodiment, the catalyst precursor may be in a metallocene form.

The carbon nanotube fibers may be directly spun from the raw material for spinning.

The supply flow rate of the spinning raw material may be in the range of 10 to 500 ml/min, and the supply flow rate of the carrier gas may be selected in the range of 1 to 5 L/min.

According to another aspect of the present invention, an aggregate of carbon nanotube fibers composed of single-wall carbon nanotubes produced by the above mentioned method is provided.

Other specific embodiments of the present invention are described in the following detailed description.

Advantageous Effects

The present invention can improve the production efficiency of carbon nanotube fibers composed of single-wall carbon nanotubes by a simple process of controlling the molar ratio or the flow rate of carbon source to reducing gas in the carrier gas injected in the production of the carbon nanotube aggregate. The aggregate of carbon nanotube fibers produced by the inventive method is expected to be applicable to various fields such as reinforcing materials for multifunctional composites, strain and damage sensors utilizing stable and repetitive piezoresistive effects, transmission lines with high conductivity, high specific surface area, electrochemical devices with excellent mechanical properties and electrical conductivity, for example microelectrode materials for sensing biomaterials, supercapacitors, actuators, etc.

DETAILED DESCRIPTION

Figure 1:
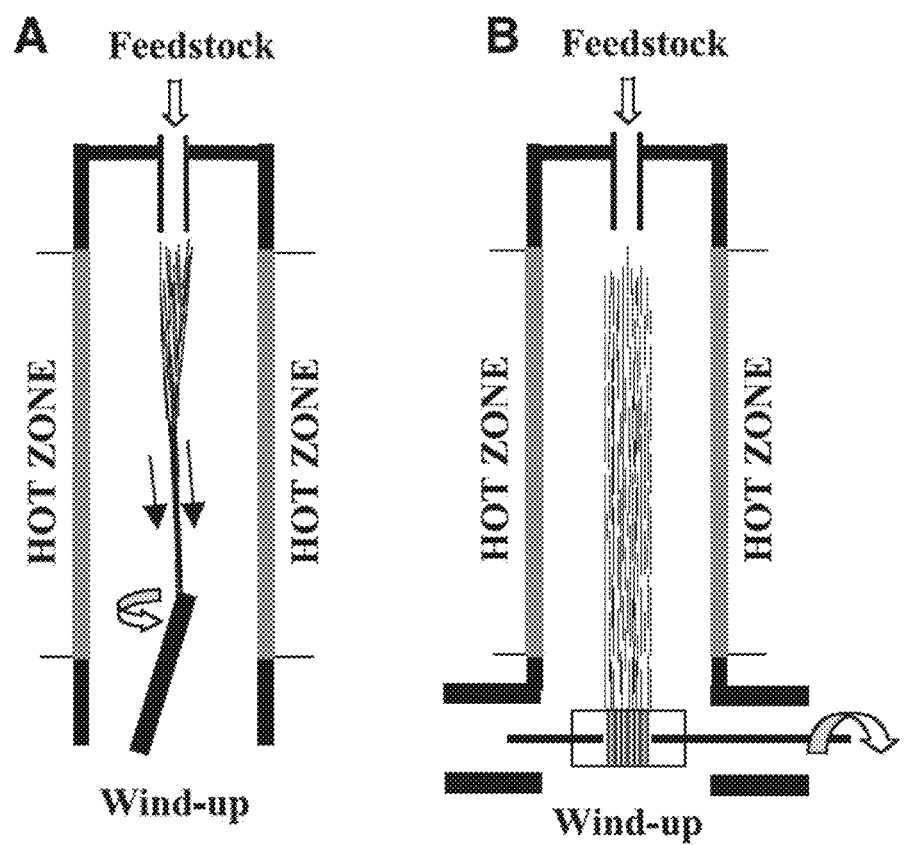
FIG. 1 schematically shows a method for producing carbon nanotube fibers by a direct spinning scheme.

The present invention is capable of various modifications and various embodiments, and particular embodiments are illustrated in the drawings and will be described in detail in the detailed description. It should be understood, however, that the present invention is not intended to be limited to any particular embodiment, but is intended to cover all modifications, equivalents, and alternatives falling within the spirit and scope of the present invention. In the following description, a detailed description of related arts will be omitted when it is determined that the gist of the present invention may be blurred.

The term "aggregate" as used herein may be understood to mean a collection of singular individuals.

The term "injection" as used herein may be described interchangeably with "inflowing" and "introducing" herein, and may be understood to mean a flow of liquid, gas or heat, etc. into the desired place.

In the specification, the term "carbon nanotube fibers" refers to both carbon nanotubes grown in fibers or a plurality of carbon nanotubes fused in a fibrous form.

Hereinafter, a method for producing an aggregate of carbon nanotube fibers according to an embodiment of the present invention will be described in detail.

MODE FOR INVENTION

Techniques for producing carbon nanotube fibers include solution spinning, array spinning, aerogel spinning, film twisting/rolling scheme, and the like. The present invention follows a process of directly spinning carbon nanotube fibers or ribbons from carbon nanotube aerogels formed immediately after the introduction of a raw material for spinning into a reactor using chemical deposition (CD).

Direct spinning is a process for injecting a raw material for spinning containing a catalyst and a carbon source with a carrier gas in a vertical furnace at a constant rate, synthesizing carbon nanotubes in the heating furnace, and fusing them, to continuously produce carbon nanotube fibers composed purely of carbon nanotubes.

The raw material for spinning containing the carbon source is carbonized and graphitized while flowing from the upper end to the lower end of the heating furnace or from the lower end to the upper end of the heating furnace to form carbon nanotube fibers composed of continuous aggregate (sock or aggregates) of carbon nanotubes.

The present invention can efficiently produce the aggregate of carbon nanotube fibers composed of single-wall carbon nanotubes by controlling the molar ratio of hydrogen gas in the carrier gas and the carbon source in the raw material for spinning injected to form the aggregate of carbon nanotube fibers.

The raw material for spinning may be prepared by dispersing a catalyst or a catalyst precursor in a carbon compound, and the catalyst or the catalyst precursor of an amount of 0.5 to 10 wt %, or 1 to 5 wt %, or 1.5 to 4 wt %, based on the weight of carbon compound that may be mixed. If an excess amount of a catalyst or a catalyst precursor for the amount of a carbon source is used, the catalyst may act as an impurity, and it is difficult to obtain high purity carbon nanotube fibers. Further, it may deteriorate the thermal, electrical, and physical properties of carbon nanotube fibers.

The catalyst precursor is a substance which, within the framework of the catalytic reaction, that itself is not included in the catalytic cycle but is converted to an active catalyst (or producing an active catalyst), and, thereafter the catalyst precursor forms a catalyst, and CNT is synthesized.

In the present invention, the catalyst or the catalyst precursor may include at least one selected from the group consisting of iron, nickel, cobalt, platinum, ruthenium, molybdenum, vanadium and oxides thereof, but is not limited thereto. The catalyst may also be in the form of nanoparticles and may be in metallocene form, such as ferrocene, preferably a compound containing iron, nickel, cobalt, and the like.

In the present invention, the raw material for spinning may further comprise a catalytic activator. Typically, the synthesis of carbon nanotubes proceeds while the catalyst is molten and carbon is diffused into the catalyst and then precipitated. The catalytic activator is used as a promoter in the synthesis of carbon nanotubes to increase the carbon diffusion rate so that carbon nanotubes are synthesized in a short time.

As the catalytic activator, for example, a sulfur element or a sulfur-containing compound may be used. In particular, it may be sulfur-containing aliphatic compounds such as methylthiol, methyl ethyl sulfide, dimethylthioketone and the like; sulfur-containing aromatic compounds such as phenyl thiol, diphenyl sulfide and the like; sulfur-containing heterocyclic compounds such as pyridine, quinoline, benzothiophene, thiophene and the like; and sulfur as an element. Preferably, it may be sulfur or thiophene, and more preferably, it may be sulfur. Sulfur decreases the melting point of the catalyst and removes amorphous carbon, allowing synthesis of high purity carbon nanotubes at a lower temperature.

According to a preferred embodiment of the present invention, the catalyst precursor and the catalytic activator may be liquid phase in case a liquid carbon compound is used, and may be gas phase in case a gaseous carbon compound is used. Therefore, the catalyst precursor and the catalytic activator may be injected into the liquid carbon compound as a liquid phase by dissolving them, and they may be injected into the gaseous carbon compound as a gas phase by vaporizing.

In the present invention, the carbon compound may be in a liquid or gas phase, diffusing as a carbon source into a catalyst to synthesize carbon nanotubes. The carbon compound may be selected in consideration of molecular weight distribution, concentration, viscosity, surface tension, permittivity and properties of the solvent used.

The liquid or gaseous carbon compound may include at least one selected from the group consisting of methane, ethylene, acetylene, methyl acetylene, vinyl acetylene, ethanol, methanol, propanol, acetone, xylene, chloroform, ethyl acetic acid, diethyl ether, polyethylene glycol, ethyl formate, mesitylene, tetrahydrofuran (THF), dimethylformamide (DMF), dichloromethane, hexane, benzene, carbon tetrachloride, and pentane.

Specifically, the liquid carbon compound may include at least one selected from the group consisting of ethanol, methanol, propanol, acetone, xylene, chloroform, ethyl acetic acid, diethyl ether, polyethylene glycol, ethyl formate, mesitylene, tetrahydrofuran (THF), dimethylformamide (DMF), dichloromethane, hexane, benzene, carbon tetrachloride, and pentane. Preferably, it may include at least one selected from the group consisting of ethanol ($C_2H_5OH$), xylene ($C_8H_{10}$), diethyl ether [$(C_2H_5)_2O$], polyethylene glycol [—$CH_2$—$CH_2$—$O)_9$], 1-propanol ($CH_3CH_2CH_2OH$), acetone ($CH_3OCH_3$), ethyl formate ($CH_3CH_2COOH$), benzene ($C_6H_6$), hexane ($C_6H_{14}$) and mesitylene [$C_6H_3(CH_3)_3$].

The gaseous carbon compound may include at least one selected from the group consisting of methane, ethylene, acetylene, methyl acetylene, and vinyl acetylene.

According to the present invention, an aggregate of carbon nanotube fibers composed of single-wall carbon nanotubes may be produced by controlling the molar ratio of the reducing gas to the carbon source (carbon source/reducing gas) in the carrier gas to be less than 0.065.

Further, according to one embodiment, the value of IG/ID of the aggregate of carbon nanotube fibers may satisfy the following Equation 1.

$$(-4.06\times10^2)A+29.4 \leq IG/ID \leq (-4.06\times10^2)A+37.5 \qquad \text{[Equation 1]}$$

In the above Equation 1, A is the molar ratio of the carbon source to the reducing gas (carbon source/reducing gas).

The IG/ID means, the maximum peak intensity ID in the range of 1560 $cm^{-1}$ to 1600 $cm^{-1}$, and the maximum peak intensity ID in the range of 1310 $cm^{-1}$ to 1350 $cm^{-1}$, in the resonance Raman scattering measurement scheme.

According to one embodiment, the IG/ID value of Equation 1 may satisfy IG/ID>6.

The inventors of the present invention have confirmed that carbon nanotube fibers composed of single-wall carbon nanotubes may be obtained when the above-mentioned conditions are satisfied, and in contrast, carbon nanotube fibers composed of multi-walled carbon nanotubes may be obtained when IG/ID<6 or A>0.065 in the above Equation 1. More preferably, the IG/ID may be 6.5 or more, or 7 or more, or 8 or more, and A may be 0.065 or less, or 0.064 or less, or 0.063 or less.

According to one embodiment, the carrier gas comprises a reducing gas, and the reducing gas may be a hydrogen gas, ammonia gas, or a combination thereof.

Further, the carrier gas may further include an inert gas. The inert gas may include a gas containing nitrogen, helium, neon, argon, krypton, xenon, radon or a mixture thereof. Since such an inert gas is chemically very stable and has a property of not exchanging or sharing electrons, the gas inflow can serve to flow and move the carbon nanotubes (CNTs) without reacting with the carbon nanotubes.

In the present invention, the feed flow rate of the raw material for spinning supplied to the reaction zone may be 10 to 500 $cm^3$/min, preferably 50 to 200 $cm^3$/min or 80 to 150 $cm^3$/min.

Further, the flow rate of the carrier gas injected into the reaction region may be determined within a range satisfying the condition of the above-mentioned Equation 1. For example, it may be appropriately selected in the range of 1 to 5 L/min or 1.5 to 3 L/min in the case of hydrogen gas.

According to another embodiment, the carrier gas may be injected at a linear velocity of 1 to 5 cm/sec, preferably at a linear velocity of 1.5 to 3 cm/sec or 1.8 to 2.5 cm/sec. The carrier injection linear velocity may vary depending on the kind of the carrier gas, the size of the reactor, the type of the catalyst, and the like.

According to a preferred embodiment, the aggregate of carbon nanotube fibers may be produced by direct spinning, in which carbon nanotube fibers or ribbon are directly (in situ) spun from carbon nanotube aerogels formed by the chemical deposition. The direct spinning is a process for injecting a raw material for spinning containing a catalyst and a carbon source with a carrier gas in a vertical furnace at a constant rate, synthesizing carbon nanotubes in the heating furnace, and fusing them to continuously produce carbon nanotube fibers composed purely of carbon nanotubes.

The reaction zone of the high-temperature furnace is a region in which a carbon source forms carbon nanotubes by a graphenization catalyst and at the same time forms a continuous aggregate. When the raw material for spinning is reacted in the reaction zone, carbon nanotubes are synthesized, and the synthesized carbon nanotubes grow or fuse together and are continuously collected, and a carbon nanotube fiber aggregate is formed. Then, the formed carbon nanotube fibers are wound using a winding means.

The temperature of the reaction zone may be 1,000 to 3,000° C. It may preferably be maintained at 1,000 to 2,000° C., 1,000 to 1,500° C. or 1,000 to 1,300° C., and more preferably 1,150 to 1,250° C. If it is less than 1000° C., carbon, there is a problem that carbon nanotube fibers are not formed. If the temperature is higher than 3000° C., there is a problem that carbon nanotubes may be vaporized. Therefore, the above ranges are preferable.

The produced carbon nanotube fibers may be wound and collected. The winding speed affects the orientation of the carbon nanotubes in the fibers in the fibers axis direction, and thereby determines the thermal, electrical, and physical properties of the carbon nanotube fibers. Preferably, it may be wound with a winding speed in the range of 5 to 100 rpm.

According to the present invention, it is possible to easily provide carbon nanotube fibers composed of single-wall carbon nanotubes. Since the fibers made of single-wall carbon nanotubes can minimize the diameter of the carbon nanotubes, the strength of the finally produced product may be improved.

Hereinafter, embodiments of the present invention will be described in detail so that those skilled in the art can easily carry out the present invention. The present invention may, however, be embodied in many different forms and should not be construed as limited to the embodiments set forth herein.

Preparation Example: Synthesis of an Aggregate of Carbon Nanotube Fibers 0.5 g/hr of ferrocene catalyst precursor and 0.135 g/hr of the sulfur catalyst activator were vaporized and introduced and Methane as a carbon compound was fed at a rate of 115 to 152.5 ml/min, and 1.8 to 2.2 L/min of carrier gas (hydrogen) was fed to the top of a cylindrical reactor at a temperature of 1200° C.

The carbon nanotube fibers discharged to the discharge port at the bottom of the reactor were wound by a winding means composed of a bobbin. The molar ratio of methane to hydrogen gas was adjusted as shown in Table 1 below.

TABLE 1

| Classification | molar ratio of $CH_4/H_2$ |
| --- | --- |
| Example 1 | 0.047 |
| Example 2 | 0.052 |
| Example 3 | 0.052 |
| Example 4 | 0.059 |
| Example 5 | 0.060 |
| Comparative Example 1 | 0.065 |
| Comparative Example 2 | 0.066 |
| Comparative Example 3 | 0.069 |
| Comparative Example 4 | 0.076 |
| Comparative Example 5 | 0.076 |

Test Example 1: Raman Spectrum Analysis of Carbon Nanotube Fibers

Figure 2A:
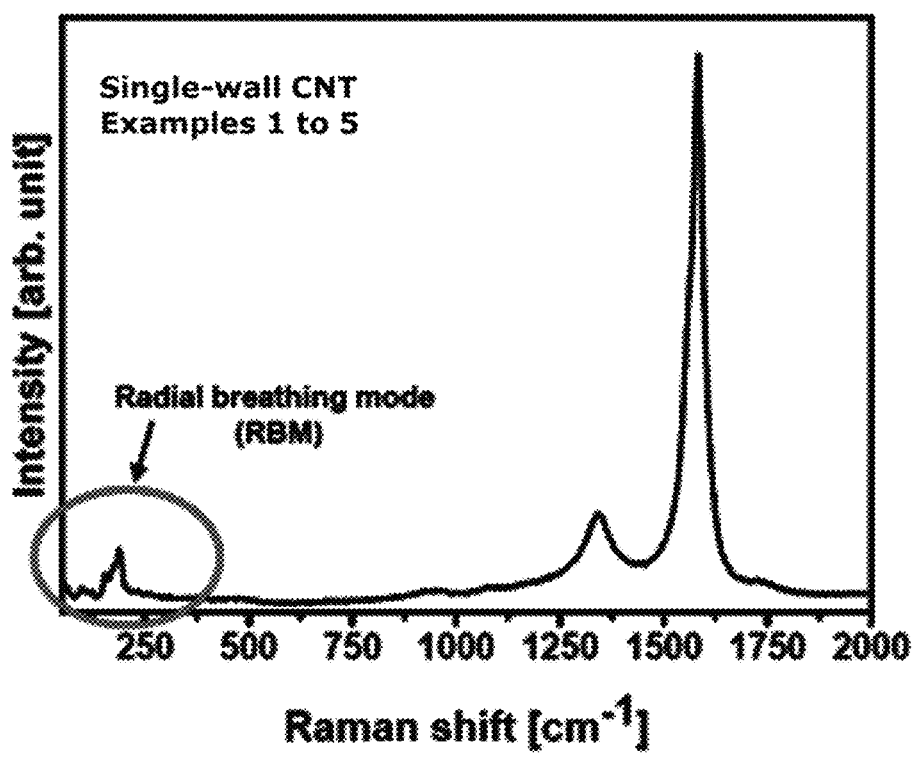
FIG. 2A is a Raman spectroscopy analysis result of carbon nanotube fibers produced according to the Examples.
Figure 2B:
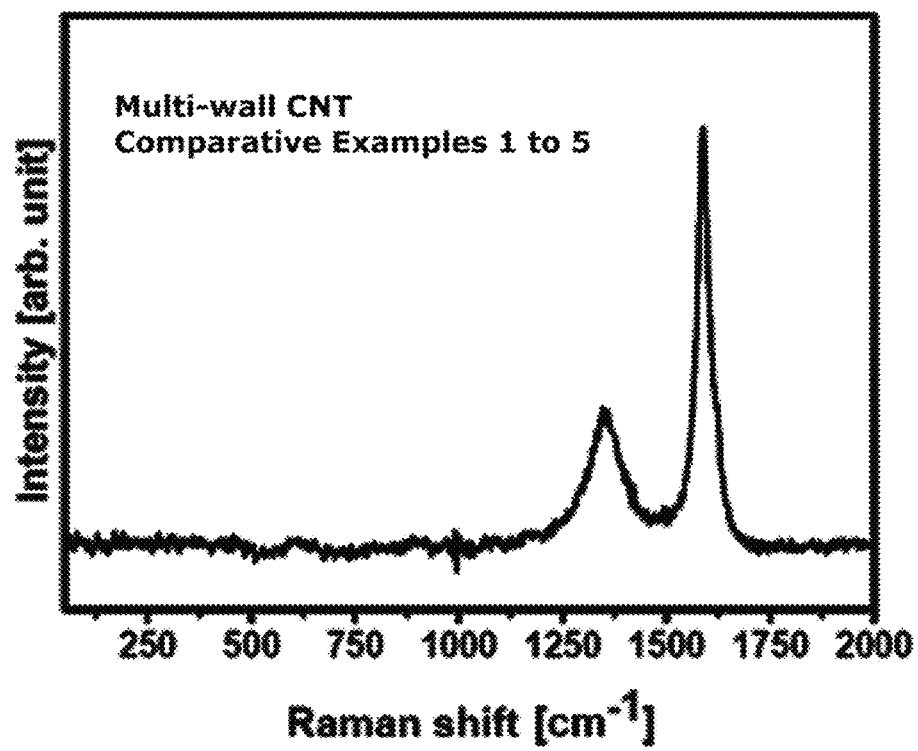
FIG. 2B is a Raman spectroscopy analysis result of carbon nanotube fibers produced according to the Comparative Examples.

In order to confirm the ratio between IG and ID values of the carbon nanotube fibers according to Example 1 and Comparative Example 1, DXR™ Raman Microscope (ThermoFisher Scientific) equipment was used. After Raman spectrum analysis was performed in maximum peak intensity IG in the range of 1560 $cm^{-1}$ to 1600 $cm^{-1}$, and maximum peak intensity ID in the range of 1310 $cm^{-1}$ to 1350 $cm^{-1}$, the results are shown in FIGS. 2A-2B.

Figure 3:
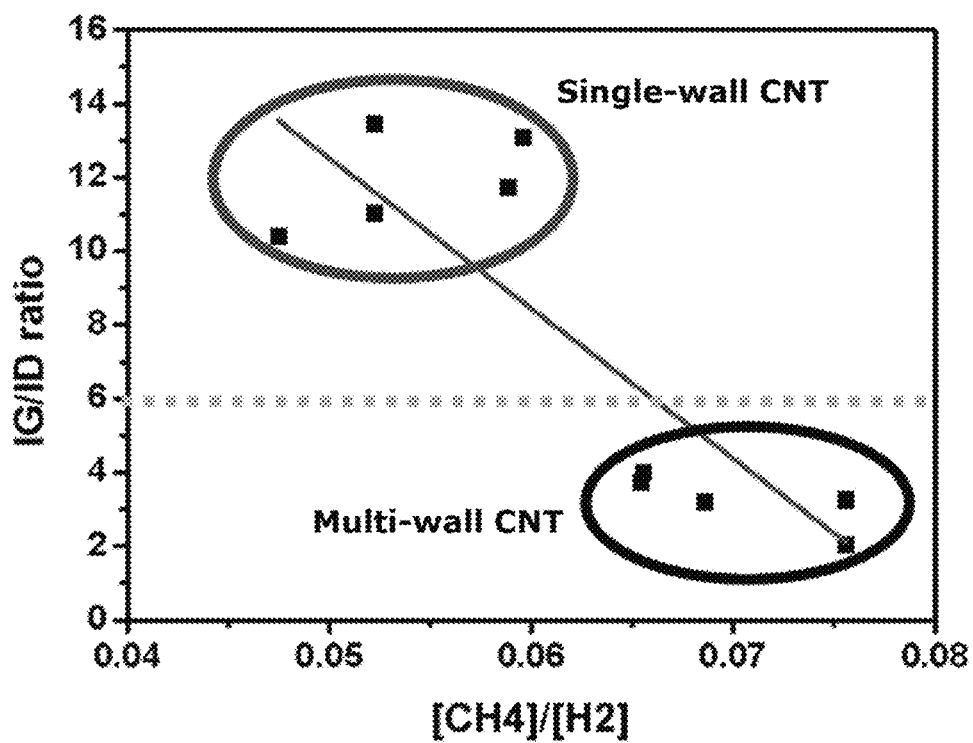
FIG. 3 is a graph showing the relationship between the molar ratio of the source and the IG/ID ratio for the carbon nanotube fibers produced according to Examples and Comparative Examples.

It is known that the vibration mode occurring at 100 to 500 $cm^{-1}$ in the radial breathing mode (RBM) is related to the carbon nanotube diameter, and it is easy to ascertain the structure of single-wall carbon nanotubes (Journal of the KSME, Sungkyunkwan University, Professor Baek Seunghyun). As shown in FIG. 3, it is confirmed that the carbon nanotube fibers according to Example 1 were composed of single-wall carbon nanotubes in view of peaks at a wavelength of 250 $cm^{-1}$, and the carbon nanotube fibers according to Comparative Example 1 were composed of multi-walled carbon nanotubes.

Experimental Example 2: Relationship Between the Molar Ratio of the Source and the IG/ID Ratio The IG/ID of the produced carbon nanotube fibers was measured and shown in Table 2 below. The same data set is plotted in FIG. 3 to confirm the relationship between the IG/ID and the source molar ratio.

TABLE 2

| Classification | IG/ID ratio |
| --- | --- |
| Example 1 | 10.41 |
| Example 2 | 13.44 |
| Example 3 | 11.03 |
| Example 4 | 11.74 |
| Example 5 | 13.09 |
| Comparative Example 1 | 3.72 |
| Comparative Example 2 | 3.99 |
| Comparative Example 3 | 3.20 |
| Comparative Example 4 | 3.25 |
| Comparative Example 5 | 2.04 |

From the results of Table 1 and Table 2, it may be seen that the following relationship is derived, $$(-4.06\times10^2)A+29.4 \leq IG/ID \leq (-4.06\times10^2)A+37.5$$

The reference line shown in FIG. 3 has the following relationship.

$$IG/ID=(-4.06\times10^2)A+32.8$$

As can be seen from the above results, by controlling the supply ratio of the carbon source gas and the carrier gas, the production efficiency of the carbon nanotube fibers composed of single-wall carbon nanotubes has been improved.

While the present invention has been particularly shown and described with reference to particular embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

The invention claimed is:

1. A method for producing an aggregate of carbon nanotube fibers composed of single-wall carbon nanotubes by spinning a raw material containing a carbon source in the presence of an inert carrier gas containing a reducing gas, the method comprising:
controlling a molar ratio of the carbon source to the reducing gas in the carrier gas and (carbon source/reducing gas) to less than 0.065, thereby producing the aggregate composed of single-wall carbon nanotubes;
wherein the molar ratio (A) of the carbon source to the reducing gas, and the value of IG/ID greater than 6, satisfy the following Equation 1:

$$(-4.06\times10^2)A+29.4 \leq IG/ID \leq (-4.06\times10^2)A+37.5 \quad \text{(Equation 1)}$$

wherein, the IG/ID means the maximum peak intensity IG in the range of 1560 cm$^{-1}$ to 1600 cm$^{-1}$ and the maximum peak intensity ID in the range of 1310 cm$^{-1}$ to 1350 cm$^{-1}$, by the resonance Raman scattering measurement scheme;

wherein a supply flow rate of the raw material for spinning is 10 to 500 ml/min, and a supply flow rate of the carrier gas is 1 to 5 L/min.

2. The method for producing the aggregate of carbon nanotube fibers according to claim 1, wherein the reducing gas comprises hydrogen gas, ammonia gas or a mixed gas thereof.

3. The method for producing the aggregate of carbon nanotube fibers according to claim 1, wherein the raw material is a catalyst precursor dispersed in a liquid or gaseous carbon compound.

4. The method for producing the aggregate of carbon nanotube fibers according to claim 3, wherein the liquid or gaseous carbon compound may include at least one selected from the group consisting of methane, ethylene, acetylene, methyl acetylene, vinyl acetylene, ethanol, methanol, propanol, acetone, xylene, chloroform, ethyl acetic acid, diethyl ether, polyethylene glycol, ethyl formate, mesitylene, tetrahydrofuran (THF), dimethylformamide (DMF), dichloromethane, hexane, benzene, carbon tetrachloride, and pentane.

5. The method for producing the aggregate of carbon nanotube fibers according to claim 3, wherein the catalyst precursor may include at least one selected from the group consisting of iron, nickel, cobalt, platinum, ruthenium, molybdenum, vanadium, and oxides thereof.

6. The method for producing the aggregate of carbon nanotube fibers according to claim 5, wherein the catalyst precursor is in a metallocene form.

7. The method for producing the aggregate of carbon nanotube fibers according to claim 1, wherein carbon nanotubes are formed from a raw material for spinning and fused continuously to spin carbon nanotube fibers directly.

* * * * *